US008619288B2

(12) United States Patent
Inoue

(10) Patent No.: US 8,619,288 B2
(45) Date of Patent: Dec. 31, 2013

(54) COMMUNICATION APPARATUS, IMAGE PROCESSING APPARATUS, IMAGE PROCESSING SYSTEM, METHOD FOR CONTROLLING THE SAME, AND STORAGE MEDIUM STORING PROGRAM

(75) Inventor: Katsuhiro Inoue, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 12/606,297

(22) Filed: Oct. 27, 2009

(65) Prior Publication Data

US 2010/0110471 A1 May 6, 2010

(30) Foreign Application Priority Data

Oct. 31, 2008 (JP) ................................ 2008-281858

(51) Int. Cl.
*G06F 3/12* (2006.01)
*G06K 15/00* (2006.01)

(52) U.S. Cl.
USPC .......... 358/1.15; 358/1.14; 358/1.9; 358/402; 709/206

(58) Field of Classification Search
USPC ........................................................ 358/1.15
See application file for complete search history.

(56) References Cited

U.S. PATENT DOCUMENTS

| | | | | |
|---|---|---|---|---|
| 2006/0044572 | A1* | 3/2006 | Nakayama | 358/1.1 |
| 2006/0192997 | A1* | 8/2006 | Matsumoto et al. | 358/1.15 |
| 2007/0008590 | A1* | 1/2007 | Lim | 358/402 |
| 2008/0259384 | A1* | 10/2008 | Ito | 358/1.15 |
| 2009/0307315 | A1* | 12/2009 | Murphy et al. | 709/206 |

FOREIGN PATENT DOCUMENTS

| | | |
|---|---|---|
| JP | 2004-287860 A | 10/2004 |
| JP | 2004-322469 A | 11/2004 |
| JP | 2007-128207 A | 5/2007 |

* cited by examiner

*Primary Examiner* — Marivelisse Santiago-Cordero
*Assistant Examiner* — Huo Long Chen
(74) *Attorney, Agent, or Firm* — Canon USA Inc. IP Division

(57) ABSTRACT

A communication apparatus connected with an image processing apparatus including a reading unit for reading an image on a document to generate image data based on the read image. The communication apparatus receives from the image processing apparatus a process definition file defining details of reading processing to be performed by the reading unit and details of transmission processing for transmitting the image data generated by the reading unit, and the image data generated by the reading unit according to the definitions described in the process definition file. The communication apparatus transmits the received image data according to the definitions described in the received process definition file. When an error occurs in image data transmission, the communication apparatus determines whether to notify the occurrence of the error to a source of the process definition file depending on details about the error occurring. When the communication apparatus determines that it is necessary to notify the occurrence of the error to the source of the process definition file as a result of the determination, the communication apparatus notifies the occurrence of the error to the source of the process definition file.

6 Claims, 21 Drawing Sheets

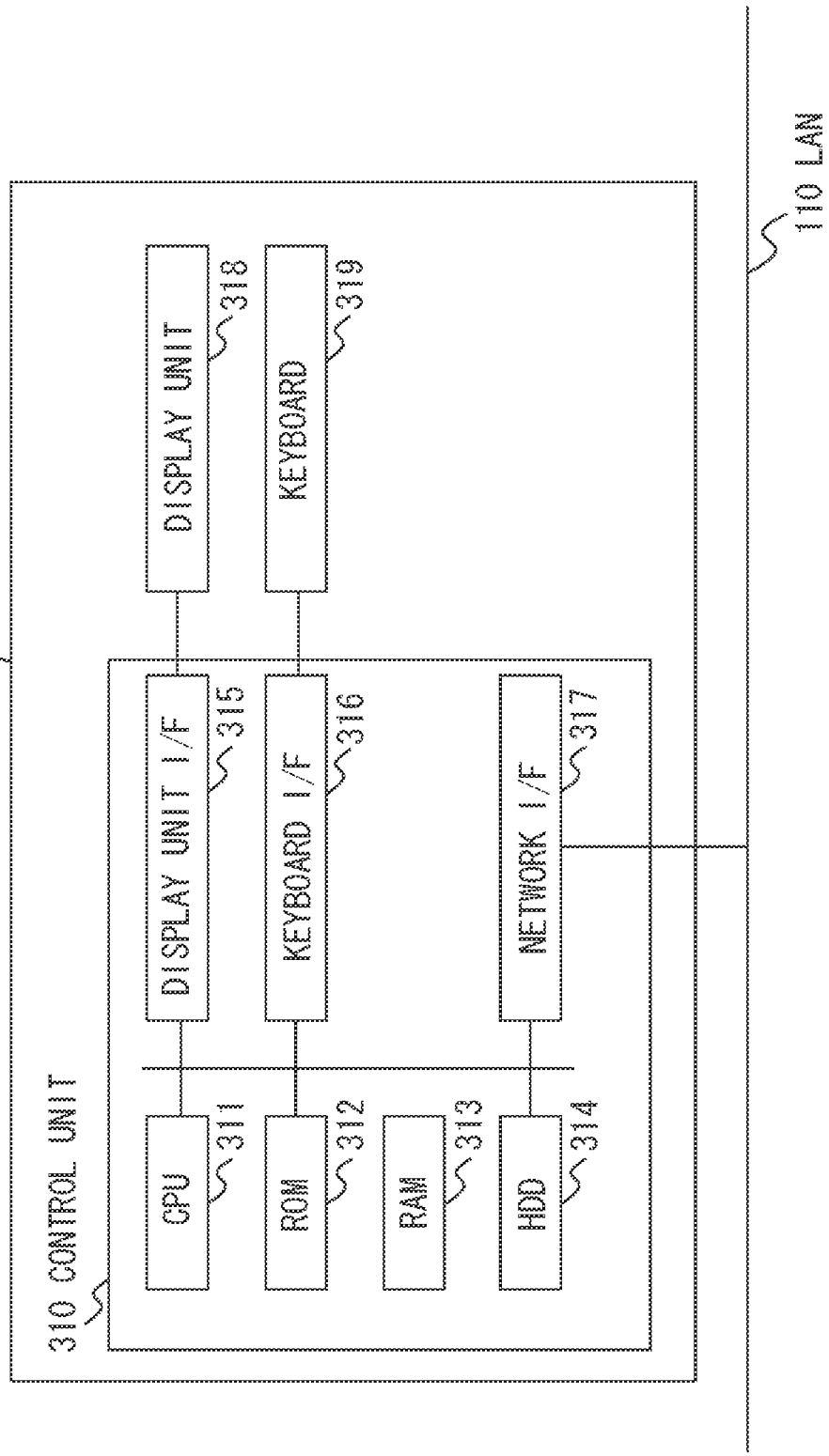

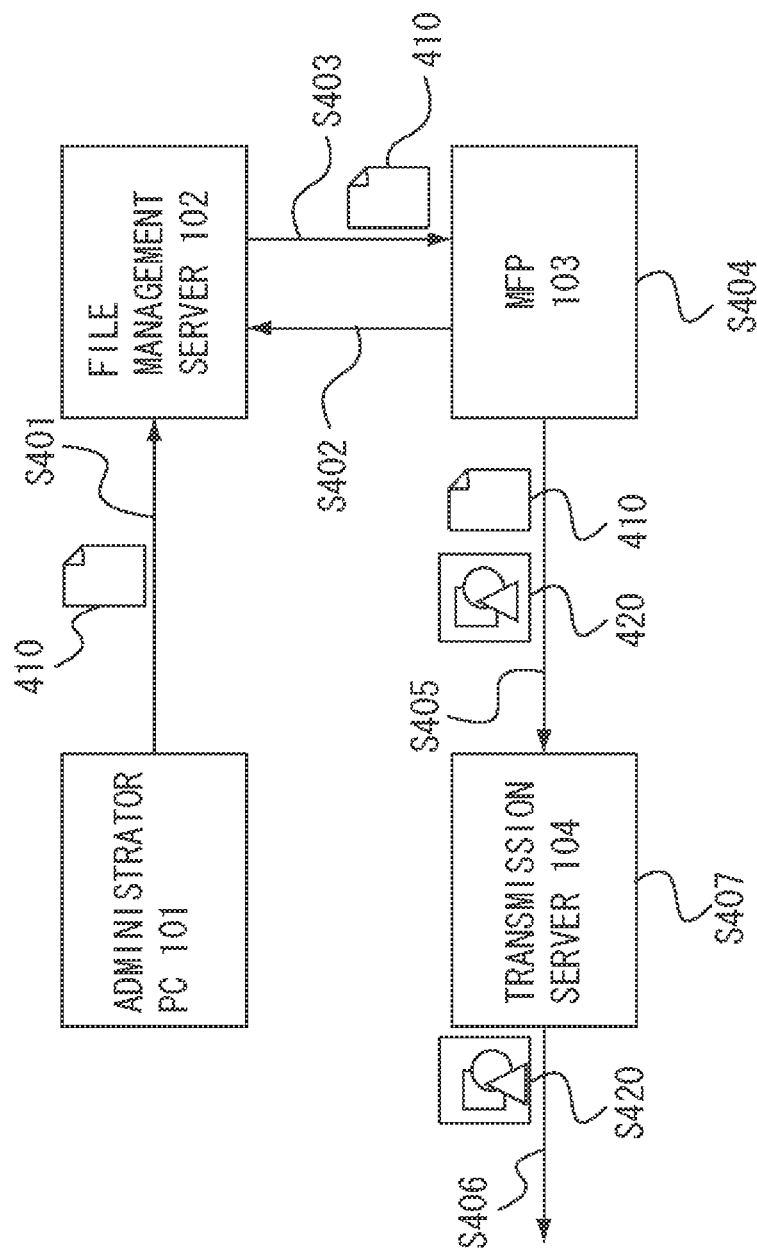

FIG. 5

410 PROCESS DEFINITION FILE

```
<?xml version="1.0"encoding="UTF-8"?>
<Process id="0001"creator="192.168.0.101"caption"
"SCAN IMAGE AND SEND E-MAIL TO MANAGER.">
    <Scan>
        <Setting type="color">
            GRAY_SCALE
        </Settinng>
        <Setting>...</Setting>
    </Scan>
    <Send type="email">
        <Setting type="address">
            manager@xxxx.xxxx
        </Setting>
        <Setting>...</Setting>
    </Send>
</Process>
```

- 501 (Process line)
- 502 (Scan)
- 503 (Setting color/GRAY_SCALE)
- 504 (Send type="email")
- 505 (Setting address)

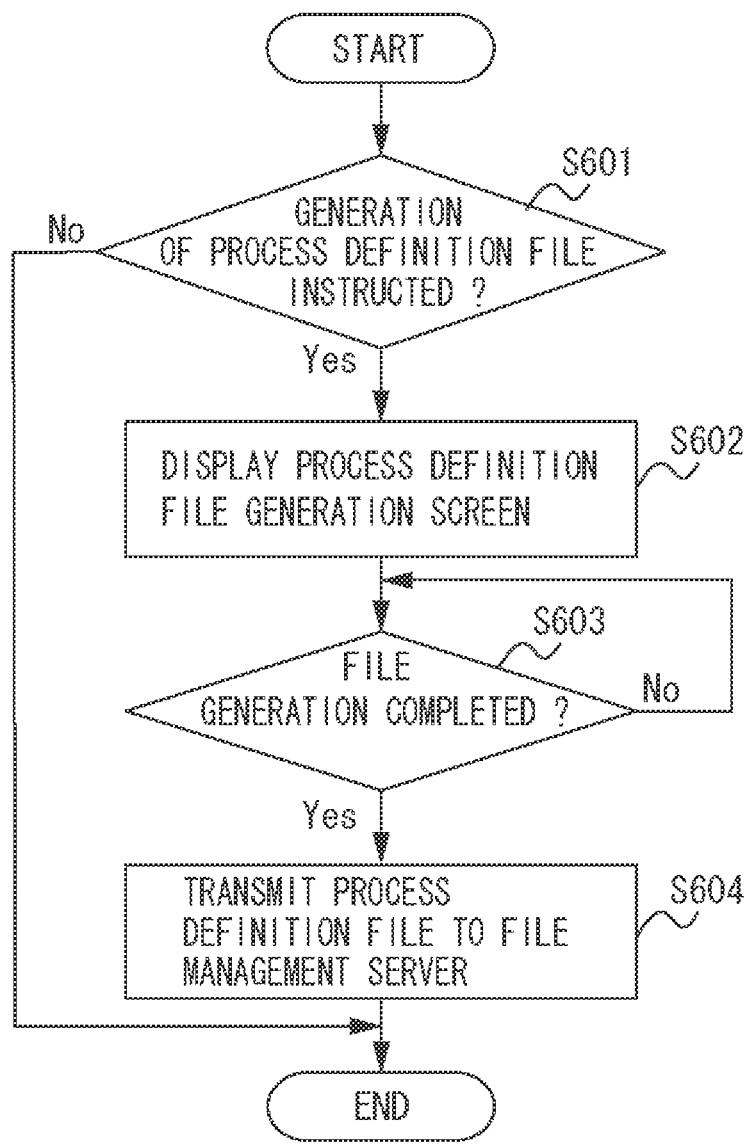

1100 UNUSABLE PROCESS DEFINITION FILE LIST

COMMUNICATION APPARATUS, IMAGE PROCESSING APPARATUS, IMAGE PROCESSING SYSTEM, METHOD FOR CONTROLLING THE SAME, AND STORAGE MEDIUM STORING PROGRAM

BACKGROUND OF THE INVENTION

1. Field of the Invention

The present invention relates to a communication apparatus, an image processing apparatus, and an image processing system which perform processing based on a process definition file defining details of reading and transmission processing methods for controlling these apparatuses, and a storage medium storing a program.

2. Description of the Related Art

In recent years, image processing apparatuses provided with a reading function for reading an image on a document to generate image data and a transmission function for transmitting the generated image data have come to be known. When a user uses such an image processing apparatus, the user specifies reading parameters for reading an image on a document as well as a transmission protocol and a destination for transmitting the generated image data. The image processing apparatus reads an image on a document, generates image data, and transmits the generated image data to a destination based on instructions given by the user.

When performing a series of processing including a plurality of functions in this way, the user needs to specify various instructions and, therefore, needs to perform troublesome operations.

To solve this issue, Japanese Patent Application Laid-Open No. 2004-287860 discusses a method for performing a plurality of services in a collaborated way, the method including the steps of preparing an instruction sheet which defines a plurality of processing steps to be executed, and processing a document based on definitions described in this instruction sheet. The method discussed in Japanese Patent Application Laid-Open No. 2004-287860 allows the user to sequentially perform the processing described in the instruction sheet simply by giving an instruction for executing the prepared instruction sheet, thus reducing the load on user operations.

Execution of a series of processing including a plurality of functions in this way may cause an error.

However, conventional methods (for example, Japanese Patent Application Laid-Open No. 2004-287860) do not take into consideration measures to be taken when an error occurs, and, therefore, the following issues may arise:

Firstly, when an error occurs during sequential execution of a plurality of processing steps, the user who instructed execution of the processing cannot immediately recognize the occurrence of the error. In this case, since the user is convinced that processing is successfully completed and notices afterwards that processing had abnormally ended, it takes time until the user gives again an instruction for executing the processing.

Secondly, if the error is caused by the content of the instruction sheet, it is necessary to correct the definitions described in the instruction sheet. However, since the occurrence of the error is not notified to the user who prepared the instruction sheet (for example, a system administrator), the instruction sheet cannot be immediately corrected.

Thirdly, if the error is caused by the content of the instruction sheet, the error occurs each time the instruction sheet is executed. Nevertheless, the instruction sheet is executed a number of times by different users and the error occurs at each execution.

SUMMARY OF THE INVENTION

The present invention is directed to a method for notifying occurrence of an error to an apparatus which supplied a process definition file (hereinafter referred to as source of the process definition file) depending on details about an error occurring in image data transmission based on definitions described in the process definition file.

According to an aspect of the present invention, a communication apparatus is connected with an image processing apparatus including a reading unit for reading an image on a document to generate image data based on the read image. The communication apparatus includes a receiving unit configured to receive from the image processing apparatus a process definition file defining details of reading processing to be performed by the reading unit and details of transmission processing for transmitting the image data generated by the reading unit, and the image data generated by the reading unit according to definitions described in the process definition file, a transmission unit configured to transmit the received image data according to the definitions described in the received process definition file, a determination unit configured to determine, when an error occurs in image data transmission by the transmission unit, whether to notify the occurrence of the error to a source of the process definition file depending on details about the error occurring, and a notification unit configured to notify the occurrence of the error to the source of the process definition file when the determination unit determines that it is necessary to notify the occurrence of the error to the source of the process definition file.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a block diagram illustrating a configuration of an administrator personal computer (PC) according to the exemplary embodiment of the present invention.

FIG. 4 schematically illustrates an overall operation of the image processing system according to the exemplary embodiment of the present invention.

FIG. 5 illustrates an exemplary description of a process definition file according to the exemplary embodiment of the present invention.

FIG. 6 is a flow chart illustrating a series of operations by the administrator PC according to the exemplary embodiment of the present invention.

DESCRIPTION OF THE EMBODIMENTS

Various exemplary embodiments, features, and aspects of the invention will be described in detail below with reference to the drawings.

A first exemplary embodiment of the present invention will be described below based on a case where an error occurring in image data transmission by a transmission server 104 is notified from the transmission server 104 to an administrator PC 101.

Figure 1:
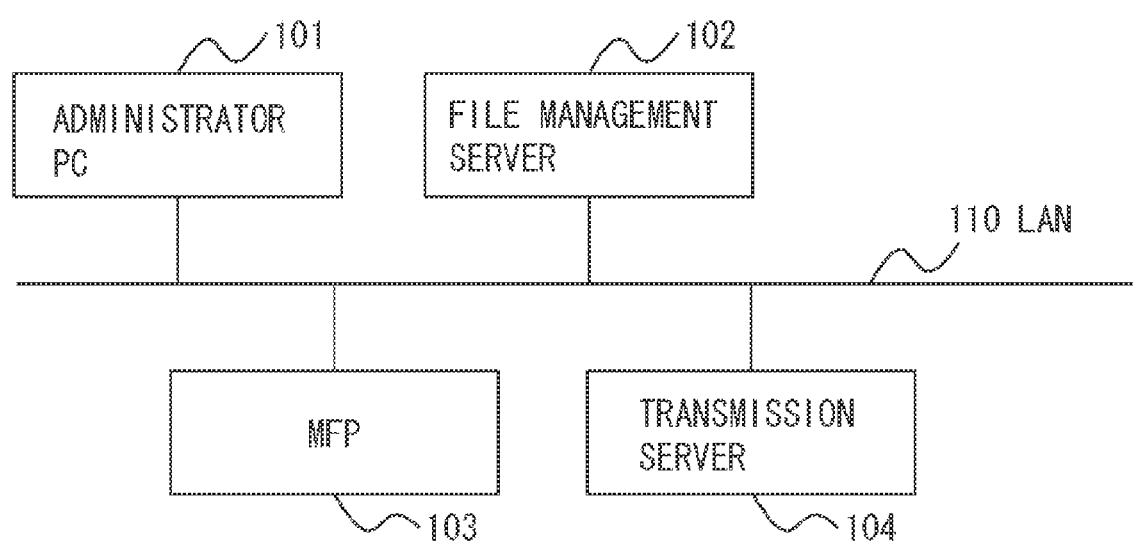
FIG. 1 illustrates an overall configuration of an image processing system according to an exemplary embodiment of the present invention.

FIG. 1 illustrates an overall configuration of an image processing system according to the first exemplary embodiment. The image processing system includes the administrator PC 101, a file management server 102, an MFP 103, and the transmission server 104, which are all connected to a LAN 110 to enable mutual communication. The LAN 110 includes an E-mail server and an FTP server (not shown) to allow the transmission server 104 to transmit image data by utilizing various methods such as E-mail and FTP protocols.

Figure 2:
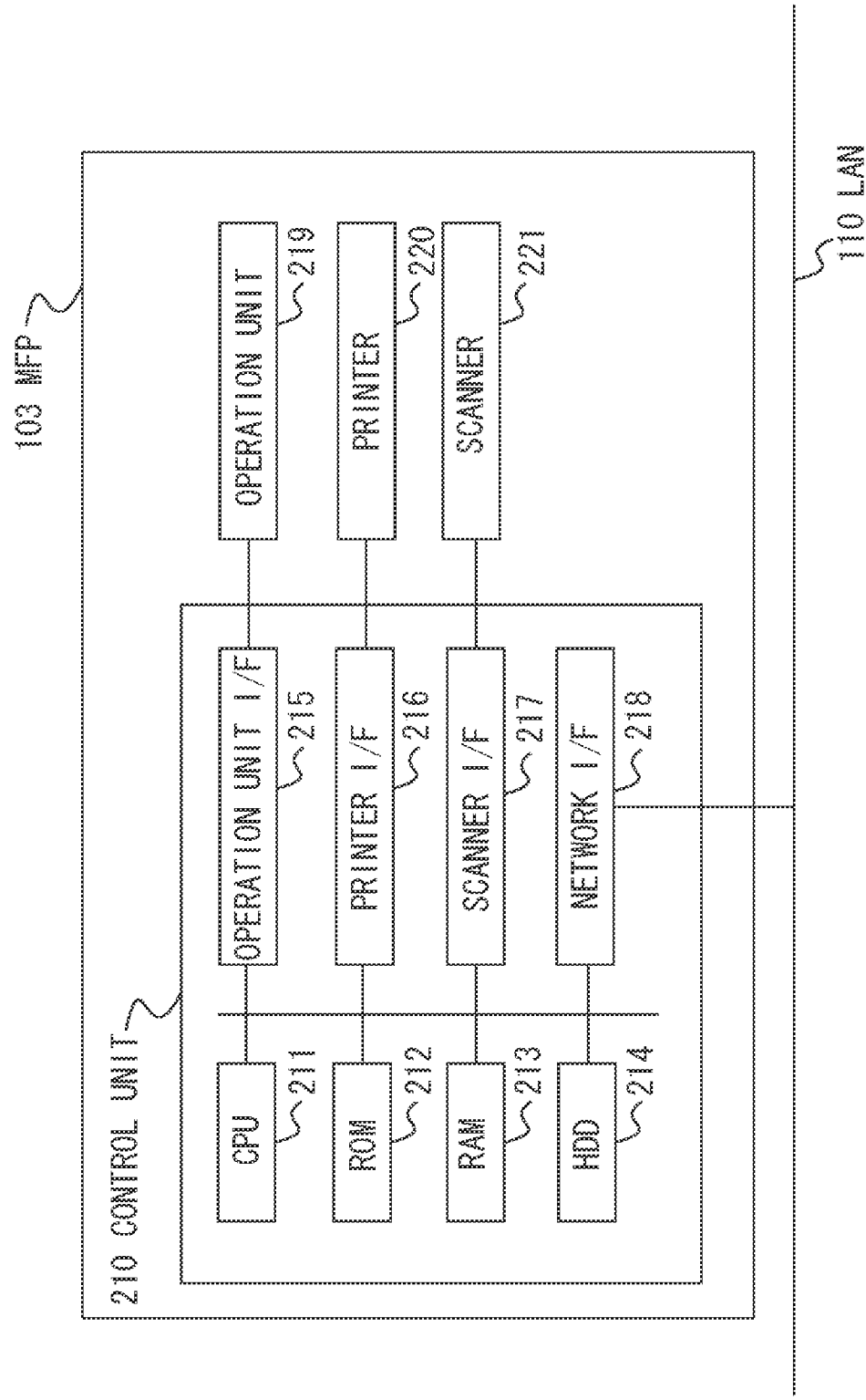
FIG. 2 is a block diagram illustrating a configuration of a multifunction peripheral (MFP) according to the exemplary embodiment of the present invention.

FIG. 2 is a block diagram illustrating a configuration of the MFP 103.

A control unit 210 includes a CPU 211 and controls the overall operation of the MFP 103. The CPU 211 reads a control program stored in a read-only memory (ROM) 212 and then performs various control processing such as reading control and transmission control. A random access memory (RAM) 213 is used as a main memory or a temporary storage area such as a work area by the CPU 211. A hard disk drive (HDD) 214 stores image data, various programs, and various information tables to be mentioned below.

An operation unit interface (I/F) 215 connects between the operation unit 219 and the control unit 210. The operation unit 219 is provided with a liquid crystal display unit having a touch-panel function, and a keyboard.

A printer I/F 216 connects between a printer 220 and the control unit 210. Image data to be printed by the printer 220 is transmitted from the control unit 210 to the printer 220 via the printer I/F 216, and then printed on a recording medium by the printer 220.

A scanner I/F 217 connects between a scanner 221 and the control unit 210. The scanner 221 reads an image on a document, generates image data, and supplies the image data to the control unit 210 via the scanner I/F 217.

A network I/F 218 connects the control unit 210 (MFP 103) to the LAN 110. The network I/F 218 transmits image data and information to external apparatuses on the LAN 110 and receives various information from external apparatuses thereon.

FIG. 3 is a block diagram illustrating the configuration of the administrator PC 101. Since the file management server 102 and the transmission server 104 are configured similar to the administrator PC 101, their configurations will be collectively described below.

A control unit 310 includes a CPU 311 and controls the overall operation of the administrator PC 101. The CPU 311 reads a control program stored in a ROM 312 and then performs various control processing. The RAM 313 is used as a main memory or a temporary storage area such as a work area by the CPU 311. A HDD 314 stores image data, various programs, and various information tables to be mentioned below.

A display unit I/F 315 connects between a display unit 318 and the control unit 310. A keyboard I/F 316 connects between a keyboard 319 and the control unit 310. The CPU 311 recognizes an instruction from the user via the keyboard 319 and then selects a screen to be displayed on the display unit 318 based on the recognized instruction.

A network I/F 317 connects the control unit 310 (administrator PC 101) to the LAN 110. The network I/F 317 transmits and receives various information to/from other apparatuses on the LAN 110.

The overall operation of the image processing system will be schematically described below with reference to FIG. 4.

First of all, a user operates the administrator PC 101 to generate a process definition file 410 and then supply the generated process definition file 410 to the image processing system. The process definition file 410 describes definitions for executing a series of processing by utilizing a plurality of functions provided by the MFP 103 and the transmission server 104.

In the present exemplary embodiment, the process definition file 410 defines a series of processing including the steps of instructing the MFP 103 to read an image on a document to generate image data, and instructing the transmission server 104 to transmit the generated image data to a predetermined destination.

The user inputs details of processing (reading parameters, destination address, etc.) via a process definition file generation screen displayed on the administrator PC 101. In step S401, the administrator PC 101 transmits the generated process definition file 410 to the file management server 102 via the LAN 110.

When the file management server 102 receives the process definition file 410, the file management server 102 registers the received process definition file 410 in association with a user ID of the user to retain the process definition file 410.

Afterwards, the user logs into the MFP 103. Then, in step S402, the MFP 103 transmits the user ID of the user who logged into the file management server 102 to request process definition files corresponding to the user who logged into the MFP 103.

Upon receipt of the request for process definition files, in step S403, the file management server 102 reads the process definition file 410 associated with the received user ID and then transmits the process definition file 410 to the MFP 103 via the LAN 110.

When the MFP 103 receives the process definition file 410 from the file management server 102, the MFP 103 indicates to the user the acquired process definition file 410 and then accepts selection of the process definition file 410 from the user. In step S404, based on the definitions described in the selected process definition file 410, the MFP 103 instructs the scanner 221 to perform a reading operation based on the definitions described in the selected process definition file 410 to generate image data 420 based on the definitions described in the selected process definition file 410.

In step S405, the MFP 103 transmits the generated image data 420 and the process definition file 410 to the transmission server 104 to request the transmission server 104 to transmit the image data 420 to a destination.

In step S406, the transmission server 104 transmits the image data 420 to a destination by utilizing the E-mail and FTP protocols based on the definitions described in the received process definition file 410. In step S407, the transmission server 104 performs processing for notifying the user of a transmission result.

The above-mentioned mechanism eliminates the need for performing troublesome operations such as specifying reading parameters and a destination address each time the user reads a document with the MFP 103. When an administrator generates the process definition file 410 with the administrator PC 101, the administrator can make arrangements so that the content of the process definition file 410 cannot be modified by the MFP 103. This makes it possible to prevent the process definition file 410 from being executed by the user of the MFP 103 in a way different from the intention of the administrator.

FIG. 5 illustrates an exemplary description of the process definition file 410 registered in the file management server 102. Although this example of the process definition file 410 is described in the XML format, the process definition file 410 can also be described in other formats. Each processing step defined in the process definition file 410 is described as an XML tag. The order of execution of processing steps agrees with the order of appearance in the process definition file 410.

A tag 501 indicates a process which includes a plurality of processing steps. The tag 501 includes, for example, a process ID which uniquely indicates the process definition file 410 ("0001" in the example of FIG. 5) and a process name ("Scan image and send E-mail to manager" in the example of FIG. 5). The tag 501 also describes an IP address ("192.168.0.101" in the example of FIG. 5) of the administrator PC 101 which generated the process definition file 410 (hereinafter referred to as a generator of the process definition file).

A tag 502 defines a step for reading an image on a document to generate image data 420 by using a scanner.

A tag 503 defines a step for generating the image data 420 with gray scale when the scanner reads the image on the document.

A tag 504 defines a step for transmitting the image data 420 by E-mail.

A tag 505 describes an E-mail address ("manager@xxxx.xxxx" in the example of FIG. 5) which is a destination of the image data 420.

FIG. 6 is a flow chart illustrating a series of operations performed by the administrator PC 101, including the steps of displaying the process definition file generation screen, generating a process definition file in response to an instruction from the user, and transmitting the generated process definition file to the file management server 102. Each operation shown in the flow chart in FIG. 6 is attained when the CPU 311 of the administrator PC 101 executes a control program.

In step S601, the CPU 311 determines whether the user has given an instruction for starting generation of a process definition file. When the user has given an instruction for starting generation of a process definition file, the CPU 311 advances processing to step S602. Otherwise, the CPU 311 terminates processing and then waits for the following instruction.

In step S602, the CPU 311 displays on the operation unit 219 a process definition file generation screen for inputting information necessary to generate a process definition file. The user inputs information necessary to define details of processing, such as read parameters and an image data destination address, via this screen.

In step S603, the CPU 311 determines whether the user has pressed the "Complete" button which indicates that the user has input information necessary to generate a process definition file. When the user has pressed the "Complete" button, the CPU 311 advances processing to step S604. Otherwise, the CPU 311 waits until the user presses the "Complete" button.

In step S604, the CPU 311 generates a process definition file based on the input information, transmits the generated process definition file to the file management server 102, and then terminates processing.

Figure 7:
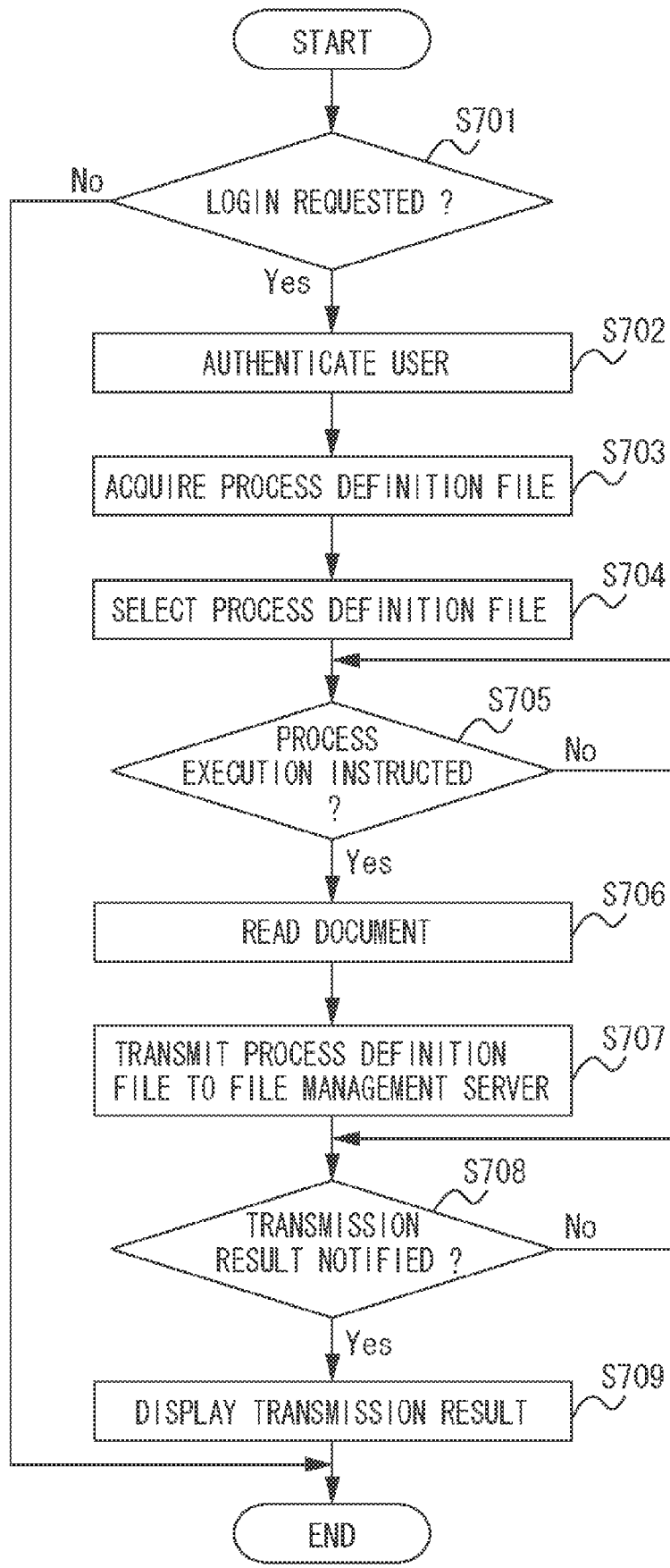
FIG. 7 is a flow chart illustrating a series of operations by an MFP according to the exemplary embodiment of the present invention.

FIG. 7 is a flow chart illustrating a series of operations performed by the MFP 103 based on a selected process definition file, including the steps of performing a reading operation, generating image data, and requesting the transmission server 104 to transmit the image data to a destination. Each operation shown in the flow chart in FIG. 7 is attained when the CPU 211 of the MFP 103 executes a control program.

In step S701, the CPU 211 determines whether a user has requested login. When the user has requested login, the CPU 211 advances processing to step S702. Otherwise, the CPU 211 terminates processing and then waits for the following processing.

In step S702, the CPU 211 authenticates the user who operates the MFP 103. Specifically, the CPU 211 displays on the operation unit 219 an authentication information input screen for inputting authentication information, compares the authentication information input via this screen with pre-stored authentication information, and authenticates the user. The method for user authentication may be attained either by reading an ID card to input authentication information or by utilizing biometric information.

When user authentication has been successfully completed, the CPU 211 advances processing to step S703 to request the file management server 102 for a process definition file. Specifically, instep S703, the CPU 211 transmits a user ID of the authenticated user to the file management server 102.

Upon receipt of the process definition file transmitted from the file management server 102, the CPU 211 displays a selection screen for prompting the user to select a desired process definition file. When a plurality of process definition files is acquired, the CPU 211 displays the acquired process definition files on the selection screen in list form. In step S704, the CPU 211 selects a process definition file in response to an instruction given from the user via the selection screen.

In step S705, the CPU 211 determines whether the user has pressed the "Execute" button displayed on the selection screen. When the user has pressed the "Execute" button, the CPU 211 advances processing to step S706. Otherwise, the CPU 211 waits until the user presses "Execute" button.

In step S706, the CPU 211 instructs the scanner 221 to perform a reading operation based on the definitions described in the selected process definition file to generate image data based on the definitions described in the selected process definition file.

In step S707, the CPU 211 transmits the selected process definition file and the generated image data to the transmission server 104 to request the transmission server 104 to transmit the image data to a destination.

In step S708, the CPU 211 determines whether a transmission result has been notified from the transmission server 104. When a transmission result has been notified, the CPU 211 advances processing to step S709. Otherwise, the CPU 211 waits until a transmission result is notified.

In step S709, the CPU 211 displays a transmission result display screen based on the content of the notification from the transmission server 104 to notify the user of the transmission result.

Figure 8:
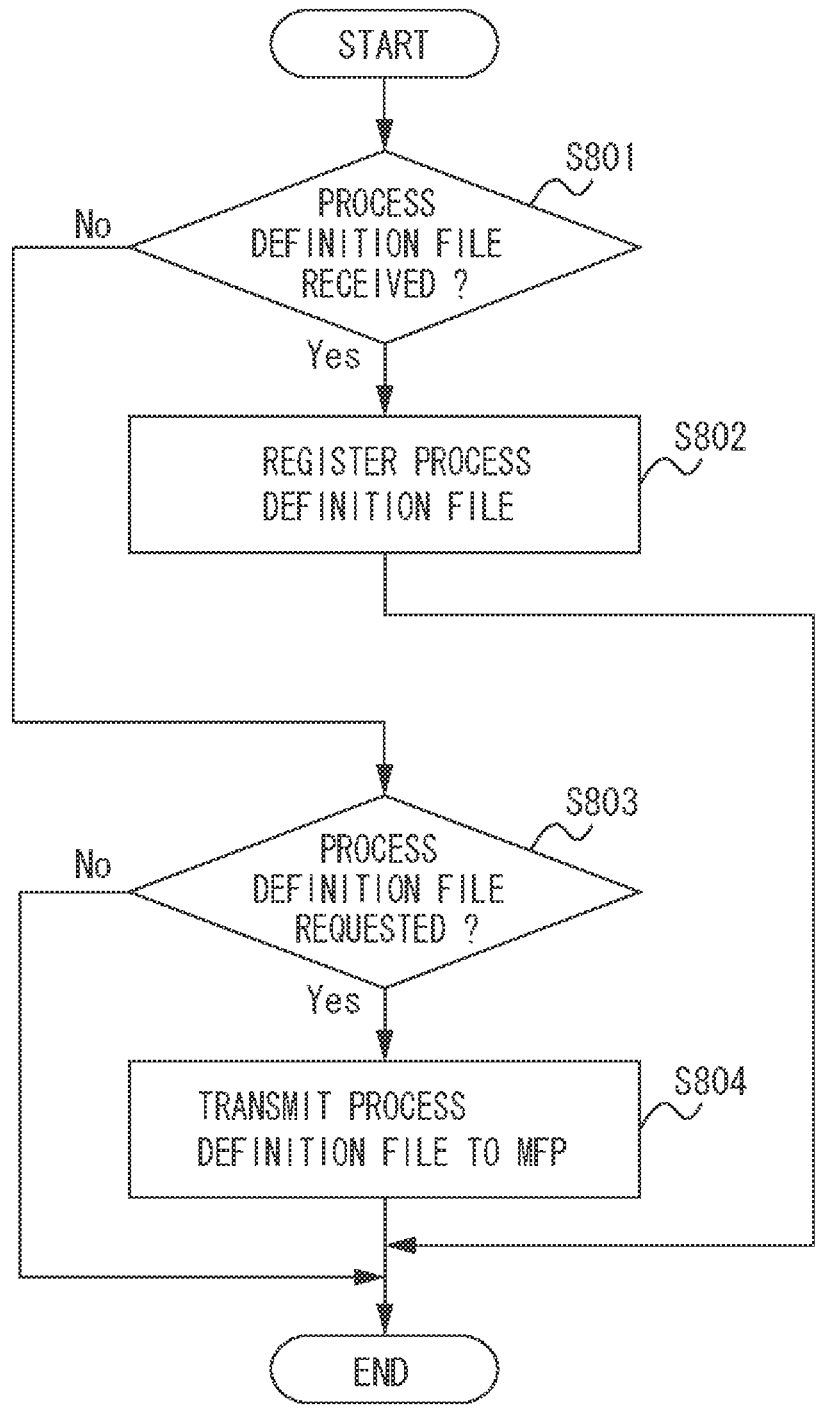
FIG. 8 is a flow chart illustrating a series of operations by a file management server according to the exemplary embodiment of the present invention.

FIG. 8 is a flow chart illustrating a series of operations performed by the file management server 102, including the steps of receiving a process definition file from the administrator PC 101, and transmitting the process definition file to the MFP 103 in response to a request from the MFP 103. Each operation shown in the flow chart in FIG. 8 is attained when the CPU 311 of the file management server 102 executes a control program.

In step S801, the CPU 311 determines whether the process definition file transmitted by the administrator PC 101 in step S604 in FIG. 6 has been received. When the process definition file has been received, the CPU 311 advances processing to step S802. Otherwise, the CPU 311 advances processing to step S803.

In step S802, the CPU 311 registers the process definition file received from the administrator PC 101 in association with the user ID. The user ID may be specified by the administrator PC 101 or given after a process definition file has been registered in the file management server 102.

Figure 9:
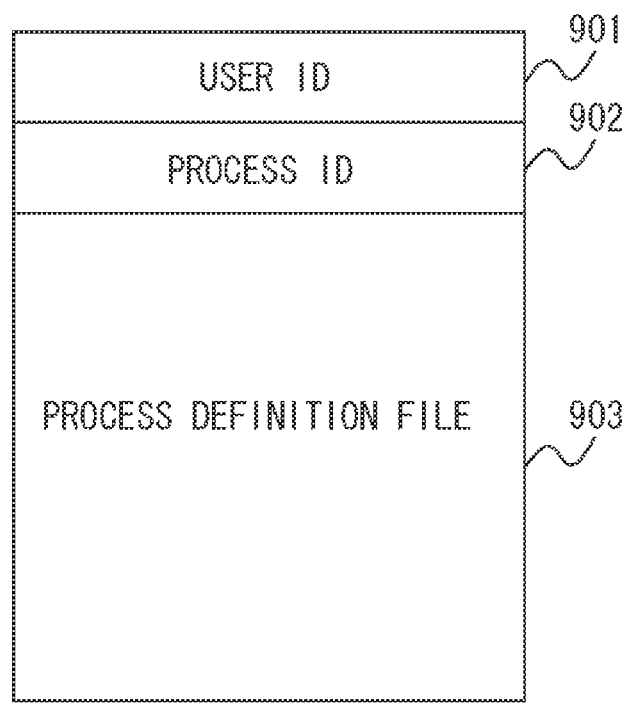
FIG. 9 illustrates a configuration of a process definition file registered in the file management server according to the exemplary embodiment of the present invention.

FIG. 9 illustrates a configuration of a process definition file registered in the file management server 102. As shown in FIG. 9, the file management server 102 retains a process definition file 903 received from the administrator PC 101 by adding to the process definition file 903 a user ID 901 and a process ID 902 for uniquely identifying the process definition file 903. The user ID 901 and the process ID 902 may be described in the process definition file 903.

In step S803, the CPU 311 determines whether the MFP 103 has requested process definition files. When the MFP 103 has requested process definition files, the CPU 311 advances processing to step S804. Otherwise, the CPU 311 terminates processing and then waits for the following instruction.

In step S804, based on the user ID 901 received from the MFP 103, the CPU 311 reads process definition files registered in association with the user ID 901 and then transmits the process definition files to the MFP 103 which requested the process definition files.

Figure 10:
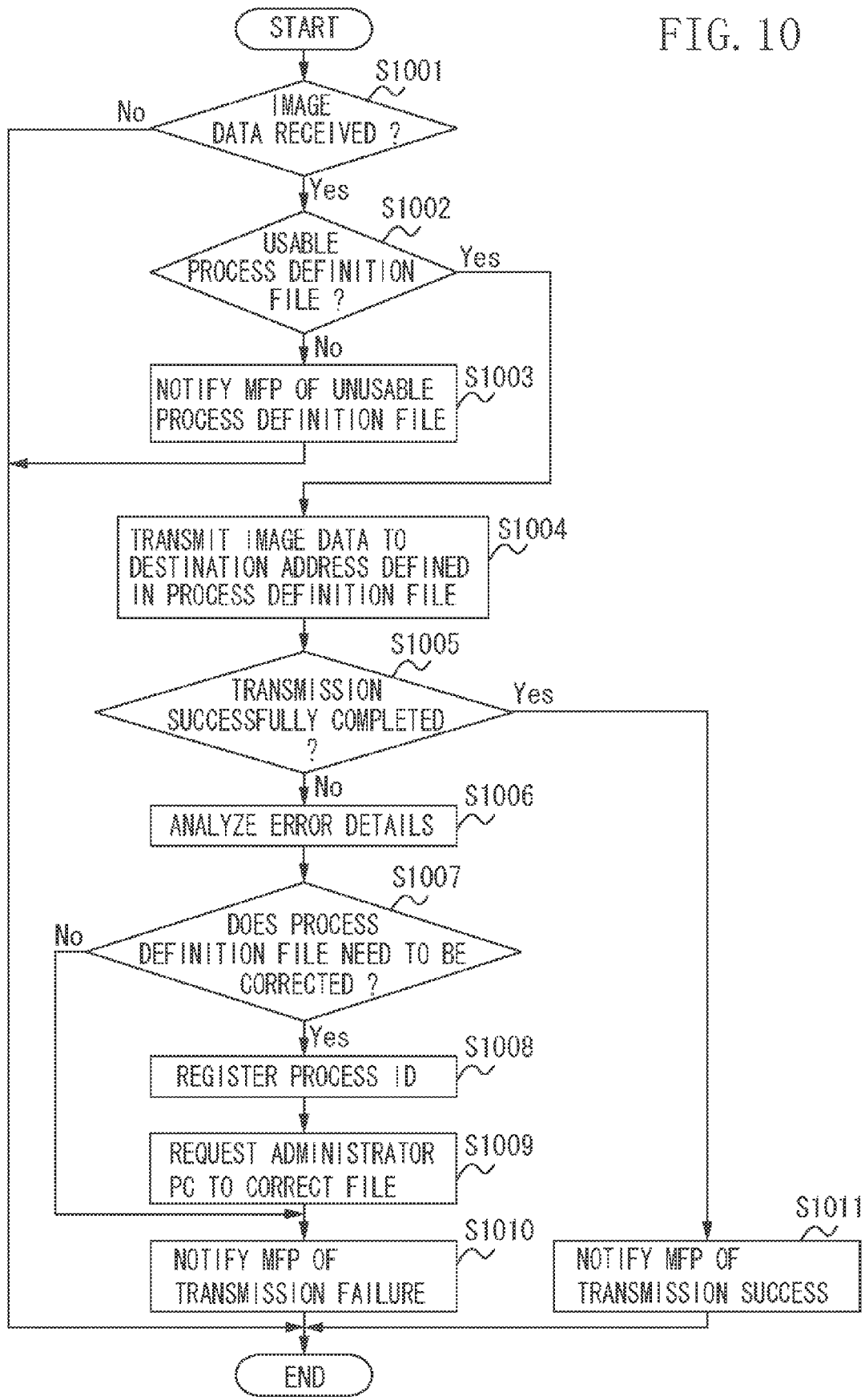
FIG. 10 is a flow chart illustrating a series of operations by a transmission server according to the exemplary embodiment of the present invention.

FIG. 10 is a flow chart illustrating a series of operations performed by the transmission server 104, including the steps of receiving a request for image data transmission from the MFP 103, and performing image data transmission. Each operation shown in the flow chart in FIG. 10 is attained when the CPU 311 of the transmission server 104 executes a control program.

In step S1001, the CPU 311 determines whether image data has been received from the MFP 103. When image data has been received from the MFP 103, the CPU 311 advances processing to step S1002. Otherwise, the CPU 311 terminates processing and then waits for the following instruction.

In step S1002, the CPU 311 determines whether a process definition file received from the MFP 103 together with the image data is a usable process definition file. This determination processing will be mentioned in detail below.

When the CPU 311 determines that the received process definition file is a usable process definition file as a result of the determination in step S1002, the CPU 311 advances processing to step S1004. Otherwise, when the CPU 311 determines that the received process definition file is an unusable process definition file, the CPU 311 advances processing to step S1003 to notify the MFP 103 which requested image data transmission that the received process definition file is not a usable process definition file, and then terminates processing.

In step S1004, the CPU 311 transmits the received image data to a destination by utilizing the E-mail or FTP protocol based on the definitions described in the process definition file.

In step S1005, the CPU 311 determines whether image data transmission has been successfully completed. When image data transmission is successfully completed, the CPU 311 advances processing to step S1011 to notify the MFP 103 of completion of transmission and then terminates processing.

On the other hand, when image data transmission is not successfully completed (transmission failed because of an error), the CPU 311 advances processing to step S1006 to analyze details about the error occurred.

In step S1007, the CPU 311 determines whether correction of the process definition file content is required, i.e., whether it is necessary to notify the error occurrence to the administrator PC 101, a generator of the process definition file, depending on details of error analysis.

Correction of the process definition file content is required, for example, in the following cases:
The CPU 311 cannot find an image data destination address (for example, an E-mail address) described in the process definition file; and
Although generation of color image data is defined in the process definition file, an apparatus at an image data destination address described in the process definition file cannot process color image data.

Correction of the process definition file content is not required, for example, in the following cases:
The CPU 311 cannot transmit image data because the apparatus (for example, a facsimile) at the image data destination address described in the process definition file is busy; and
The CPU 311 cannot transmit image data because of a network failure in the transmission server 104.

When the CPU 311 determines that it is necessary to correct the process definition file content as a result of the determination in step S1007, the CPU 311 advances processing to step S1008. In step S1008, the CPU 311 registers in an unusable process definition file list 1100 a process ID for identifying the process definition file received in step S1001.

Figure 11:
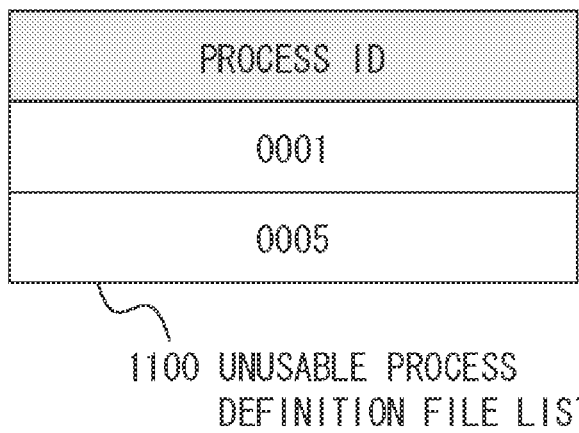
FIG. 11 illustrates an unusable process definition file list according to the exemplary embodiment of the present invention.

FIG. 11 illustrates the unusable process definition file list 1100 retained in the HDD 314 of the transmission server 104. The use of process definition files identified by process IDs registered in the unusable process definition file list 1100 is restricted. In other words, when the CPU 311 determines that it is necessary to correct the process definition file content in step S1007, execution of the process definition file without properly correcting its content will cause an error. Therefore, process IDs of process definition files determined to require correction are managed to restrict the use of these files. This prevents an error from repeatedly occurring when such process definition files subject to error occurrence are executed.

The CPU 311 performs the determination processing in step S1002 based on the unusable process definition file list 1100. Specifically, the CPU 311 compares the process ID of the process definition file received in step S1001 with each process ID managed in the unusable process definition file list 1100. When the two process IDs coincide with each other, the CPU 311 determines that the received process definition file is an unusable process definition file.

In step S1008, the CPU 311 registers the process ID of the received process definition file in the unusable process definition file list 1100. In step S1009, the CPU 311 requests the administrator PC 101, a generator of the process definition file determined to require correction, to correct its content. Since the information about the generator of the process definition file is described in the process definition file (the tag 501 in FIG. 5), the CPU 311 can specify the generator of the process definition file by extracting this information.

When the CPU 311 determines that it is unnecessary to correct the process definition file content as a result of the determination in step S1007, or after the CPU 311 requests the administrator PC 101 to correct the process definition file content in step S1009, the CPU 311 advances processing to step S1010. In step S1010, the CPU 311 notifies the MFP 103 of transmission failure and then terminates processing.

Figure 12:
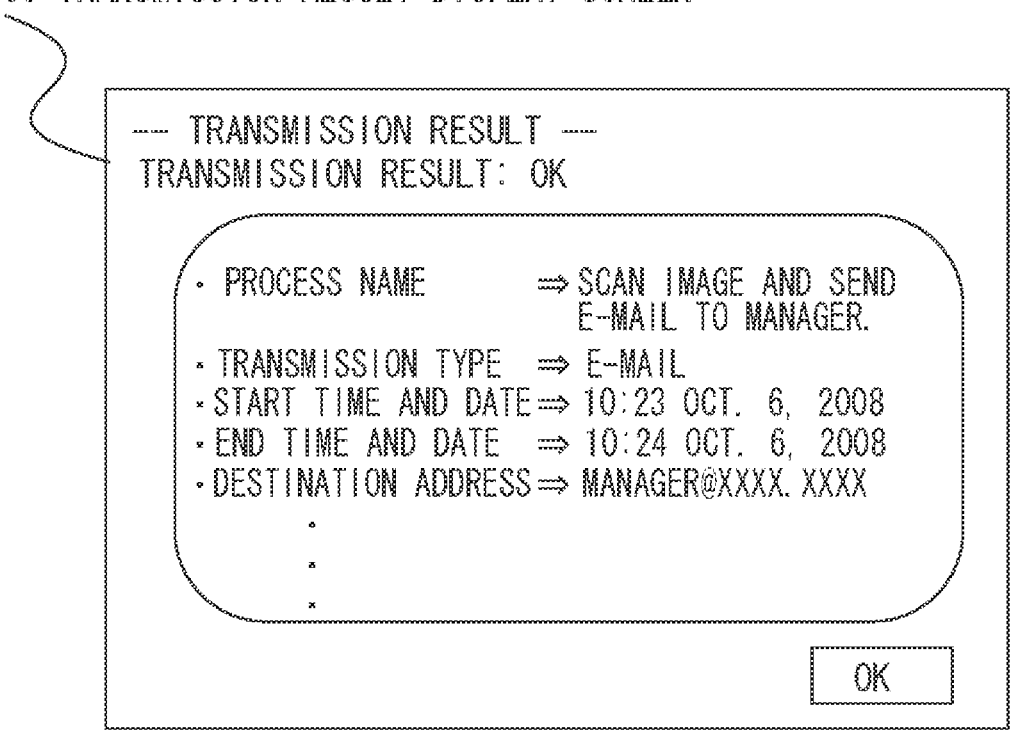
FIG. 12 illustrates a transmission result display screen displayed on an operation unit of the MFP according to the exemplary embodiment of the present invention.

FIG. 12 illustrates a transmission result display screen 1200 displayed on the operation unit 219 of the MFP 103 when image data transmission from the transmission server 104 is successfully completed. The transmission result display screen 1200 displays a transmission result ("OK" in the example of FIG. 12) together with a process name indicating a user-selected process definition file and information about the start/end time of processing.

Figure 13:
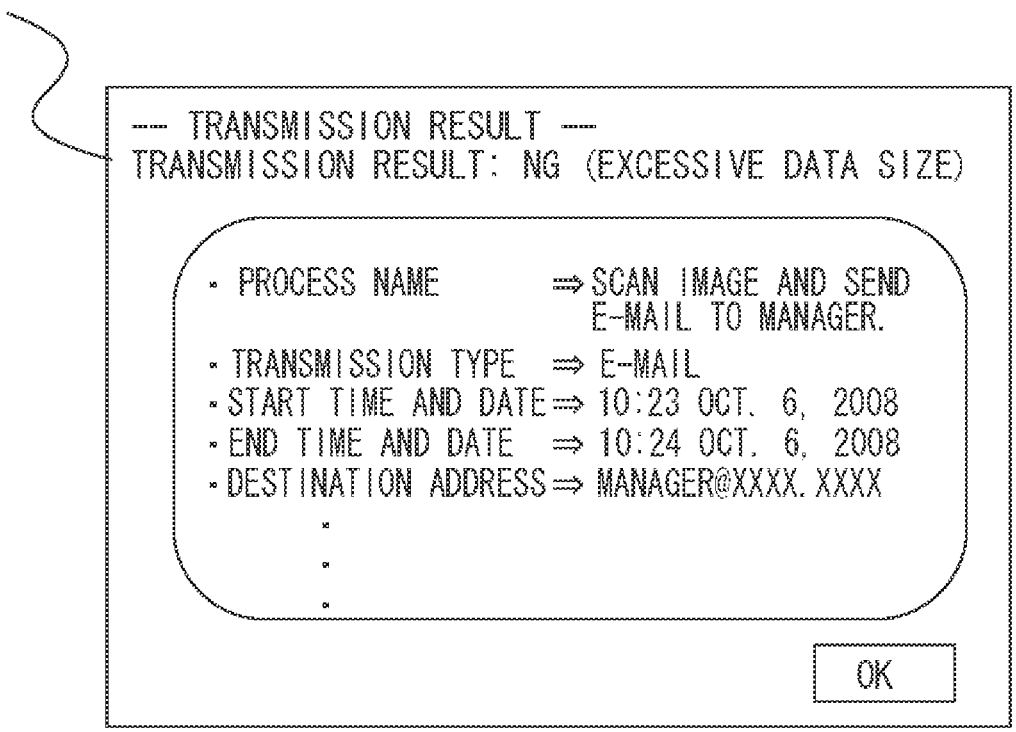
FIG. 13 illustrates a transmission result display screen displayed on the operation unit of the MFP according to the exemplary embodiment of the present invention.

FIG. 13 illustrates a transmission result display screen 1300 displayed on the operation unit 219 of the MFP 103 when image data transmission from the transmission server 104 fails. The transmission result display screen 1300 displays a transmission result ("NG" in the example of FIG. 13) together with a process name indicating a user-selected process definition file and information about the start/end time of processing. When image data transmission fails, the screen 1300 also displays a cause of the failure ("Excessive data size" in the example of FIG. 13).

Figure 14:
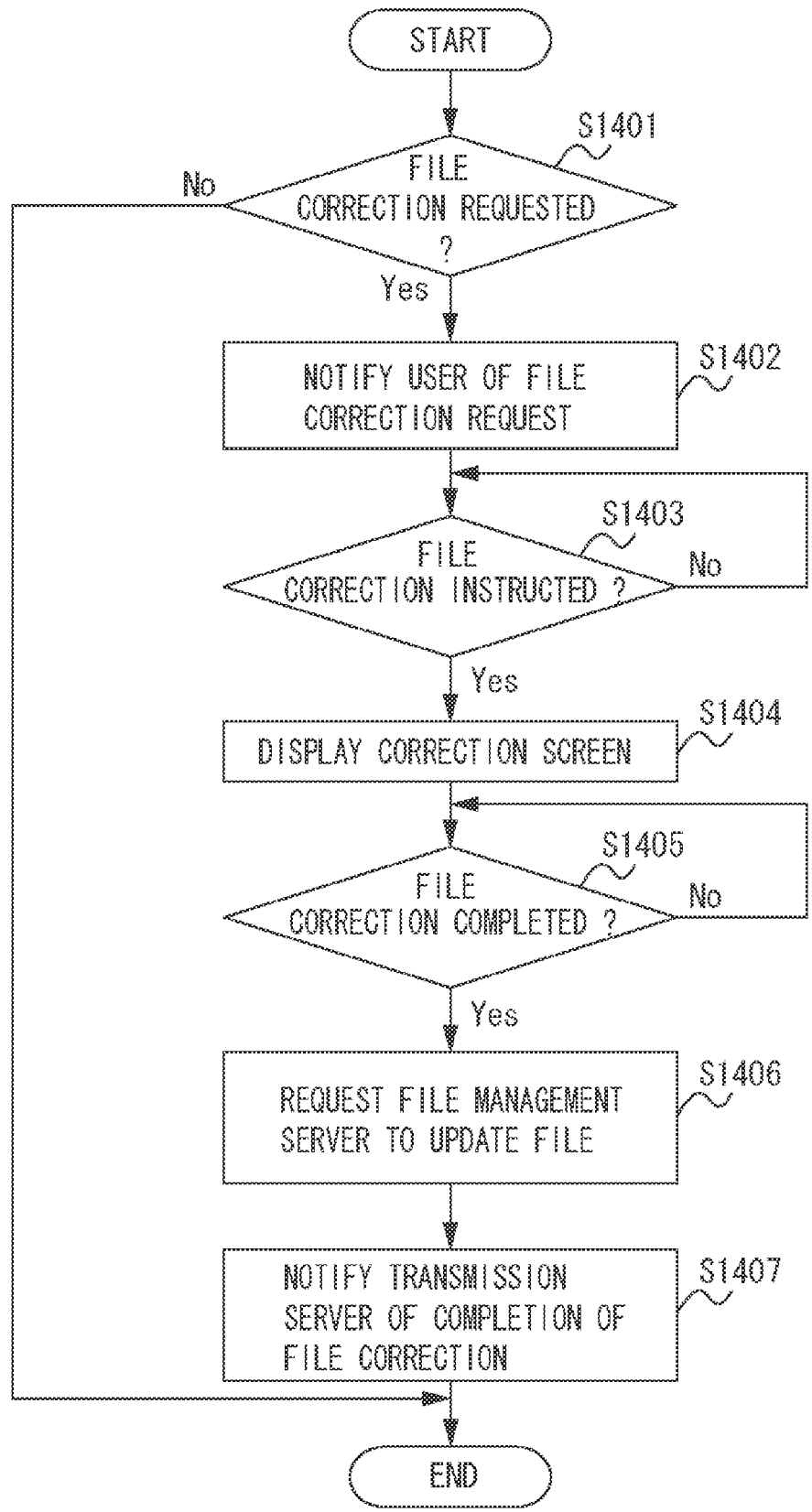
FIG. 14 is a flow chart illustrating a series of operations by the administrator PC according to the exemplary embodiment of the present invention.

FIG. 14 is a flow chart illustrating a series of operations performed by the administrator PC 101, including the steps of receiving a request for correcting the content of a process definition file from the transmission server 104, and correcting its content. Each operation shown in the flowchart in FIG. 14 is attained when the CPU 311 of the administrator PC 101 executes a control program.

In step S1401, the CPU 311 determines whether the transmission server 104 has requested correction of the process definition file content. When the transmission server 104 has requested correction of the process definition file content as a result of the determination, the CPU 311 advances processing to step S1402. Otherwise, the CPU 311 terminates processing and then waits for the following instruction.

In step S1402, the CPU 311 notifies the user that an error has occurred as a result of execution of the process definition file and that the error is caused by the process definition file content. In this case, the process ID of the process definition file may be shown to the user.

In step S1403, the CPU 311 determines whether the user has instructed correction of the process definition file content. When the user has instructed correction of the process definition file content, the CPU 311 advances processing to step S1404. Otherwise, the CPU 311 waits until the user instructs correction of the process definition file content.

In step S1404, the CPU 311 displays a correction screen for correcting the process definition file content. Before displaying the correction screen, the administrator PC 101 may acquire a process definition file from the file management server 102 and then display its content (content before correction).

In step S1405, the CPU 311 determines whether the user has pressed the "Complete" button which indicates that the user has corrected the process definition file content. When the user has pressed the "Complete" button, the CPU 311 advances processing to step S1406. Otherwise, the CPU 311 waits until the user presses the "Complete" button.

In step S1406, the CPU 311 notifies the file management server 102 of the correction instructed by the user and then requests the file management server 102 to update the process definition file managed by the file management server 102.

In step S1407, the CPU 311 notifies the transmission server 104 that correction of the process definition file content is completed.

Figure 15:
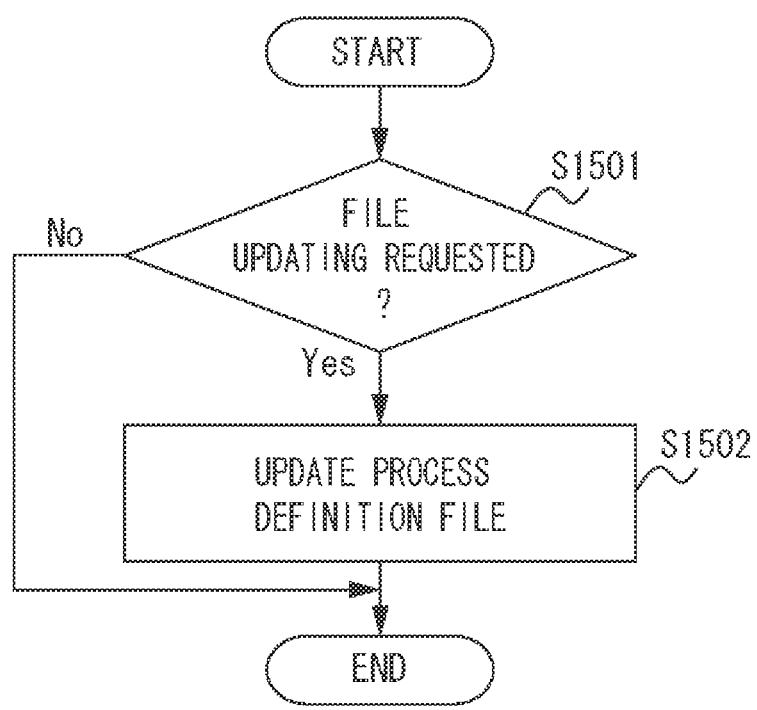
FIG. 15 is a flow chart illustrating a series of operations by the file management server according to the exemplary embodiment of the present invention.

FIG. 15 is a flow chart illustrating a series of operations performed by the file management server 102, including the steps of receiving a request to update a process definition file from the administrator PC 101, and updating the process definition file. Each operation shown in the flowchart in FIG. 15 is attained when the CPU 311 of the file management server 102 executes a control program.

In step S1501, the CPU 311 determines whether the file management server 102 has received a request to update a process definition file. When the file management server 102 has received a request to update a process definition file, the CPU 311 advances processing to step S1502. Otherwise, the CPU 311 terminates processing and then waits for the following instruction.

In step S1502, the CPU 311 updates the process definition file managed by the file management server 102 according to the updating request received from the administrator PC 101.

Figure 16:
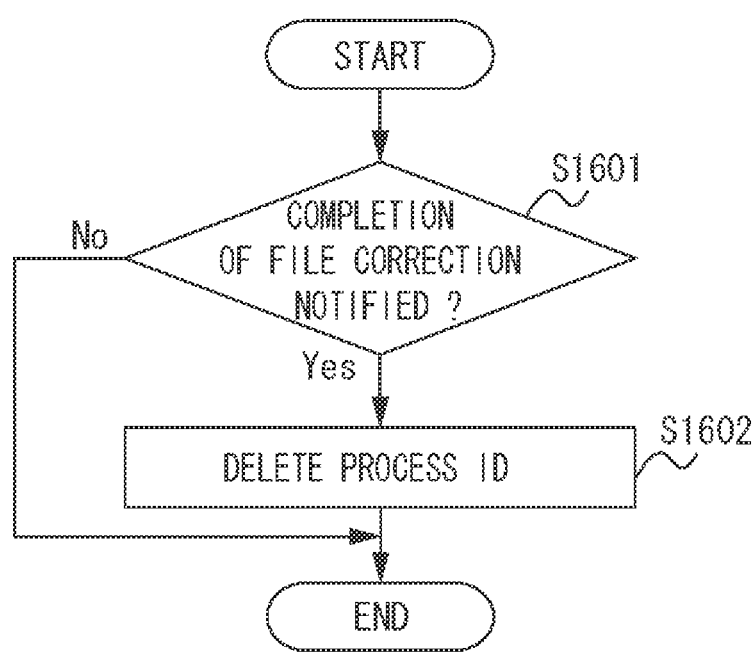
FIG. 16 is a flow chart illustrating a series of operations by the transmission server according to the exemplary embodiment of the present invention.

FIG. 16 is a flow chart illustrating a series of operations performed by the transmission server 104, including the steps of receiving a notification that correction of the process definition file content is completed from the administrator PC 101, and deleting a relevant process ID registered. Each operation shown in the flow chart in FIG. 16 is attained when the CPU 311 of the transmission server 104 executes a control program.

In step S1601, the CPU 311 determines whether the transmission server 104 has received a notification that correction of the process definition file content is completed. When the transmission server 104 has received a notification that correction of the process definition file content is completed, the CPU 311 advances processing to step S1602. Otherwise, the CPU 311 terminates processing and then waits for the following instruction.

In step S1602, the CPU 311 deletes from the unusable process definition file list 1100 in FIG. 11 a process ID of the process definition file that has been corrected. At this timing, the restriction on the use of the process definition file is canceled.

According to the above-mentioned first exemplary embodiment, when an error occurs in image data transmission by the transmission server 104, the transmission server 104 requests the generator of the process definition file received from the MFP 103 to correct its content. This allows the user who generated the process definition file to know that correction of its content is required and quickly correct the process definition file content.

When an error occurs in image data transmission by the transmission server 104, the CPU 311 also notifies the MFP 103 of the error occurrence. Therefore, the error occurrence can also be notified to the user who instructed execution of the process definition file.

In the first exemplary embodiment, the transmission server 104 analyzes details about the error and, when the transmission server 104 determines that it is necessary to correct the process definition file content, the CPU 311 requests the generator of the process definition file to correct its content. This allows the CPU 311 to request the generator of the process definition file to correct its content only when file correction is required, instead of requesting file correction each time an error occurs.

In the first exemplary embodiment, when the CPU 311 requests the generator of the process definition file to correct its content, the use of the process definition file is inhibited. This prevents process definition files subject to error occurrence from being repeatedly used and accordingly prevents an error from repeatedly occurring.

A second exemplary embodiment of the present invention will be described below. While the first exemplary embodiment has specifically been described based on a case where, when an error occurs in image data transmission, the transmission server 104 analyzes details about the error and requests the administrator PC 101 to correct the process definition file content, the second exemplary embodiment will be described based on a case where the MFP 103 performs this processing.

Further, while the first exemplary embodiment has specifically been described based on a case where, when the transmission server 104 requests correction of the process definition file content, the transmission server 104 retains the process ID of the process definition file, the second exemplary embodiment will be described based on a case where the MFP 103 performs this processing.

Figure 17:
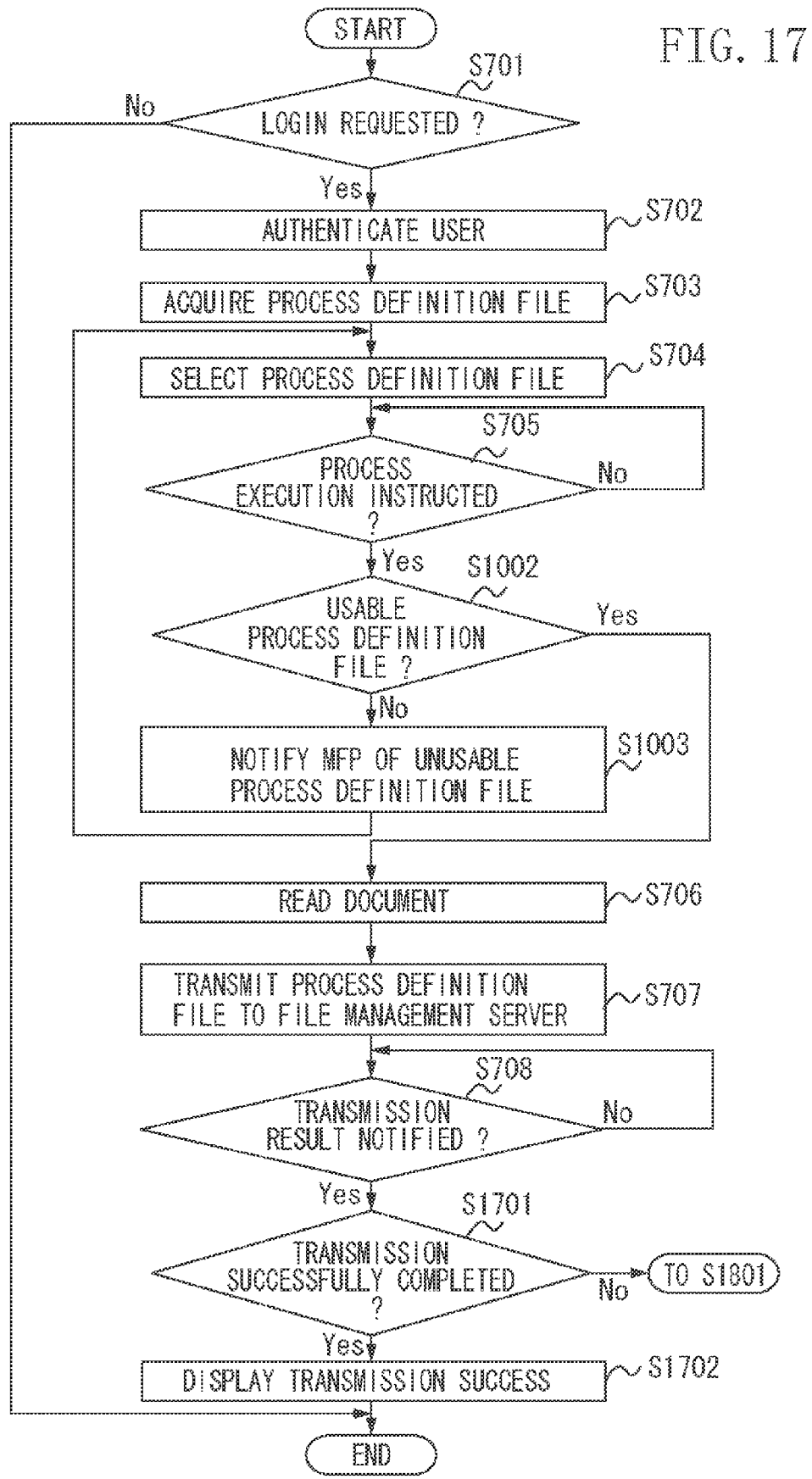
FIG. 17 is a flow chart illustrating a series of operations by the MFP according to the exemplary embodiment of the present invention.
Figure 18:
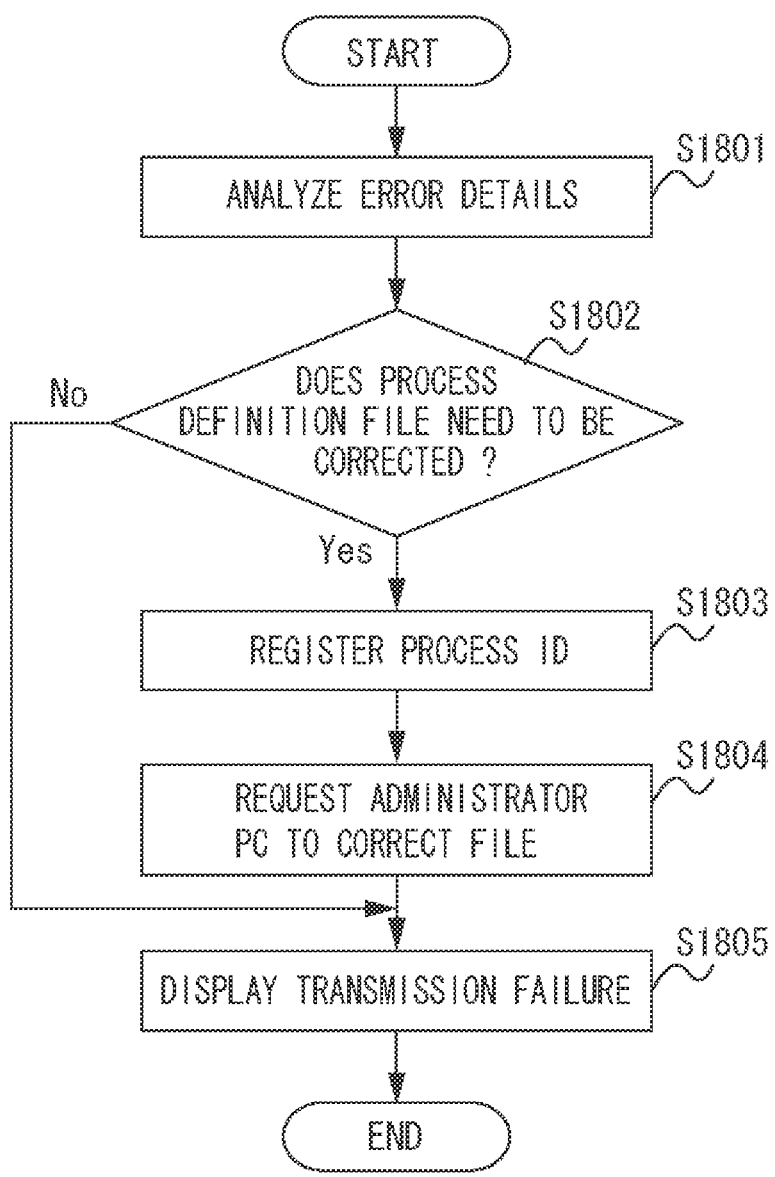
FIG. 18 is a flow chart illustrating a series of operations by the MFP according to the exemplary embodiment of the present invention.

FIGS. 17 and 18 are flowcharts illustrating a series of operations performed by the MFP 103, including the steps of performing a reading operation based on a selected process definition file, generating image data, and requesting the transmission server 104 to transmit the image data to a destination. Each operation shown in the flow charts in FIGS. 17 and 18 is attained when the CPU 211 of the MFP 103 executes a control program.

In steps S701 to S708, the CPU 211 performs similar processing to the corresponding steps described in the flow chart in FIG. 7. Therefore, descriptions for these steps are not repeated.

In the second exemplary embodiment, when correction of the process definition file content is required, the MFP 103 requests the administrator PC 101 to correct the process definition file content and the MFP 103 retains a process ID of the process definition file. Therefore, in steps S1002 to S1003, the MFP 103 performs similar processing to the corresponding steps described in the flow chart in FIG. 10.

In step S1701, the CPU 211 determines whether image data transmission has been successfully completed based on the content of a notification from the transmission server 104. When the CPU 211 determines that image data transmission has been successfully completed as a result of the determination, the CPU 211 advances processing to step S1702 to display on the operation unit 219 the transmission result display screen 1200 showing that image data transmission has been successfully completed. On the other hand, when the CPU 211 determines that image data transmission has failed, the CPU 211 advances processing to step S1801.

In step S1801, the CPU 211 analyzes details about the error occurred based on a transmission result notified from the transmission server 104. In step S1802, the CPU 211 determines whether correction of the process definition file content is required depending on details of error analysis. When correction of the process definition file content is required, and when correction of the process definition file content is not required, the CPU 211 performs similar processing to that described in the first exemplary embodiment.

When the CPU 211 determines that it is necessary to correct the process definition file content as a result of the determination in step S1802, the CPU 211 advances processing to step S1803. In step S1803, the CPU 211 registers in the unusable process definition file list 1100 retained in the MFP 103 the process ID for identifying the process definition file selected in step S704.

In step S1803, the CPU 211 registers the process ID. Then, in step S1804, the CPU 211 requests the administrator PC 101, a generator of the process definition file determined to require correction, to correct its content. Since the information about the generator of the process definition file is described in the process definition file (the tag 501 in FIG. 5), the generator of the process definition file can be specified by extracting this information.

When the CPU 211 determines that it is unnecessary to correct the process definition file content as a result of the determination in step S1802, or after the CPU 211 requests the administrator PC 101 to correct the process definition file content in step S1804, the CPU 211 advances processing to step S1805. In step S1805, the CPU 211 notifies the transmission result display screen 1300 showing transmission failure to the operation unit 219, and then terminates processing.

Figure 19:
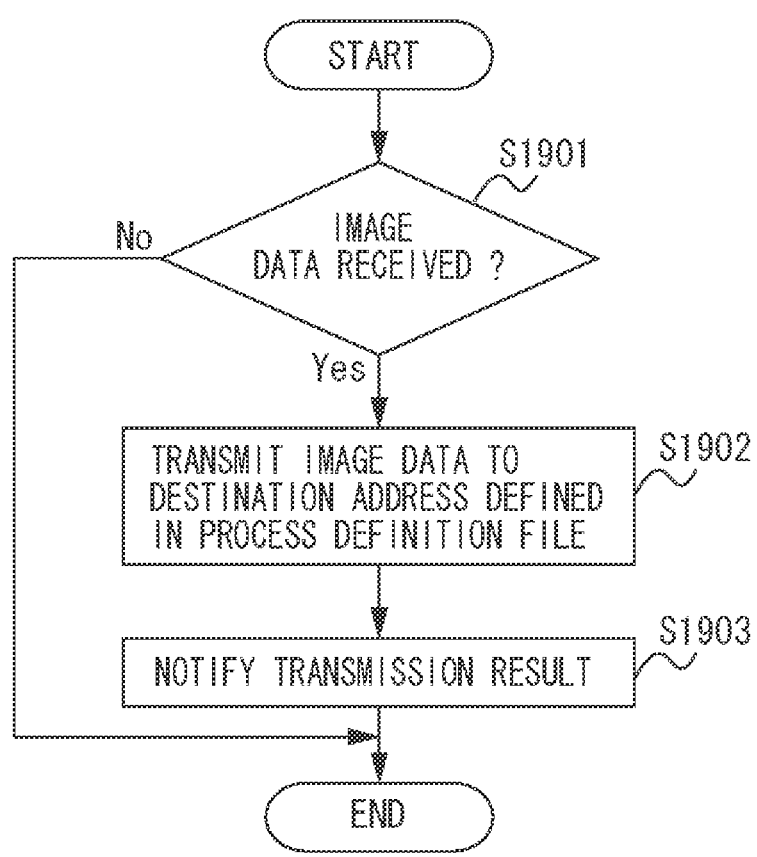
FIG. 19 is a flow chart illustrating a series of operations by the transmission server according to the exemplary embodiment of the present invention.

FIG. 19 is a flow chart illustrating a series of operations performed by the transmission server 104, including the steps of receiving a request for image data transmission from the MFP 103, and performing image data transmission. Each operation shown in the flow chart in FIG. 10 is attained when the CPU 311 of the transmission server 104 executes a control program.

In step S1901, the CPU 311 determines whether image data has been received from the MFP 103. When image data has been received from the MFP 103, the CPU 311 advances processing to step S1902. Otherwise, the CPU 311 terminates processing and then waits for the following instruction.

In step S1902, the CPU 311 transmits the received image data by utilizing the E-mail or FTP protocol based on the definitions described in the process definition file to a destination. In step S1903, the CPU 311 notifies the MFP 103 of a result of image data transmission. In this case, if image data transmission fails, the CPU 311 notifies the MFP 103 of details about the error occurred.

Figure 20:
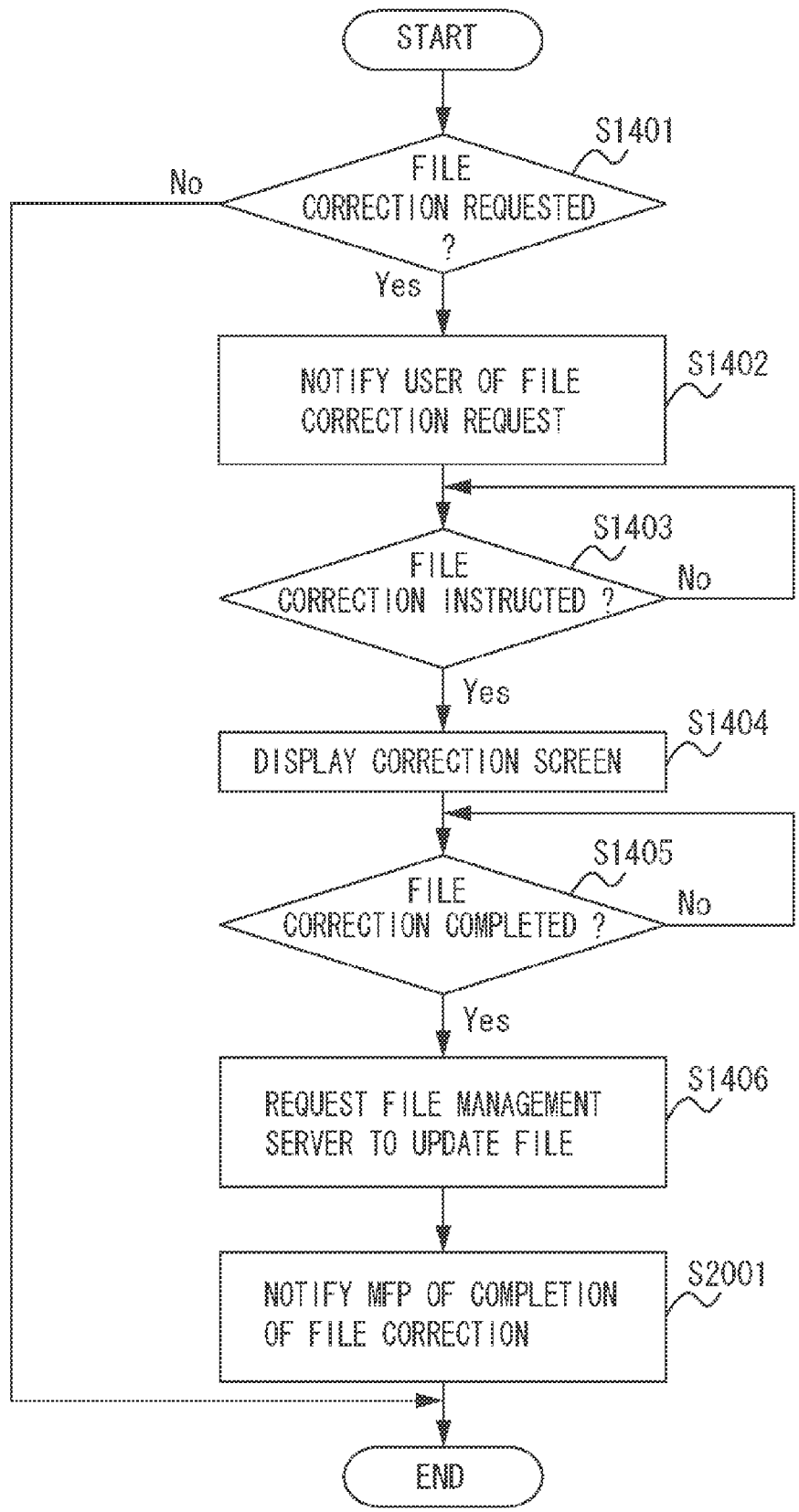
FIG. 20 is a flow chart illustrating a series of operations by the administrator PC according to the exemplary embodiment of the present invention.

FIG. 20 is a flow chart illustrating a series of operations performed by the administrator PC 101, including the steps of receiving a request for correcting the content of a process definition file from the transmission server 104, and correcting its content. Each operation shown in the flowchart in FIG. 20 is attained when the CPU 311 of the administrator PC 101 executes a control program.

In steps S1401 to S1406, the CPU 311 performs similar processing to the corresponding steps described in the flow chart in FIG. 14. Therefore, descriptions for these steps are not repeated.

In step S2001, the CPU 311 notifies the MFP 103 that correction of the process definition file content is completed.

Figure 21:
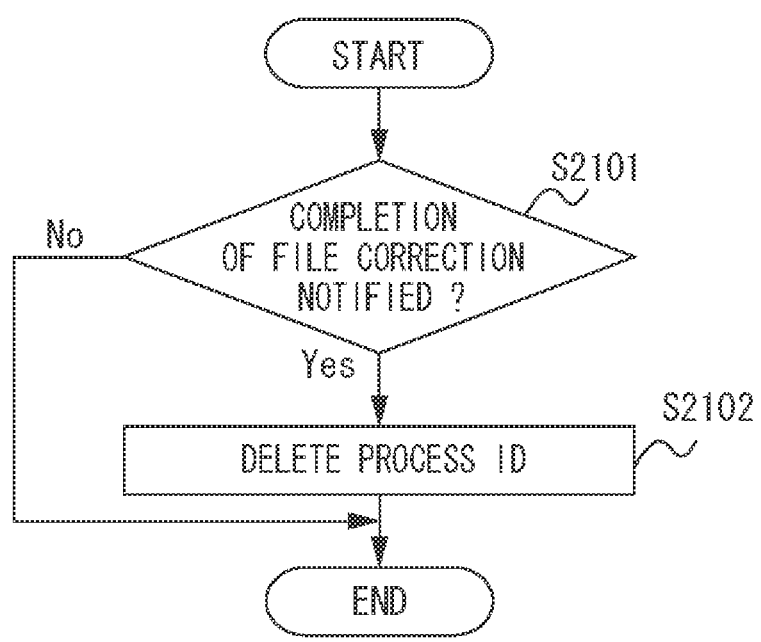
FIG. 21 is a flow chart illustrating a series of operations by the MFP according to the exemplary embodiment of the present invention.

FIG. 21 is a flow chart illustrating a series of operations performed by the MFP 103, including the steps of receiving a notification that correction of the process definition file content is completed from the administrator PC 101, and deleting a relevant process ID registered. Each operation shown in the flow chart in FIG. 21 is attained when the CPU 211 of the MFP 103 executes a control program.

In step S2101, the CPU 211 determines whether a notification that correction of the process definition file content is completed has been received. When the notification that correction of the process definition file content is completed has been received, the CPU 211 advances processing to step S2102. Otherwise, the CPU 211 terminates processing and then waits for the following instruction.

In step S2102, the CPU 211 deletes from the unusable process definition file list 1100 in FIG. 11 a process ID of the process definition file that has been corrected. This allows the use of the unusable process definition file.

According to the above-mentioned second exemplary embodiment, when an error occurs in image data transmission, the MFP 103 requests a generator of a process definition file to correct its content. This allows the user who generated the process definition file to know that correction of its content is required and quickly correct the process definition file content.

In the second exemplary embodiment, the MFP 103 analyzes details about the error occurred. When the CPU 211 determines that it is necessary to correct the process definition file content, the MFP 103 requests the generator of the process definition file to correct its content. This allows the CPU 211 to request the generator of the process definition file to correct its content only when file correction is required, instead of requesting file correction each time an error occurs.

In the second exemplary embodiment, when the CPU 211 requests the generator of the process definition file to correct its content, the use of the process definition file is inhibited. This prevents process definition files subject to error occurrence from being repeatedly used and accordingly prevents an error from repeatedly occurring. Particularly in the second exemplary embodiment, when a process definition file selected by the user is an unusable process definition file, the MFP 103 notifies the user of that fact before performing a document reading operation. This prevents an unnecessary reading operation from being performed based on the unusable process definition file.

The above-mentioned processing steps of the first and second exemplary embodiments may be embodied independently from each other, or a plurality of processing steps thereof may be embodied in combination as required.

The first exemplary embodiment has specifically been described based on a case where the transmission server 104 manages process IDs indicating unusable process definition files. The second exemplary embodiment has specifically been described based on a case where the MFP 103 manages process IDs indicating unusable process definition files. However, instead of the above, it is possible that the file management server 102 manages process IDs and that, when the CPU 211 requests correction of the process definition file content, the CPU 211 notifies the file management server 102 of the process ID of the process definition file to be corrected. This prevents the file management server 102 from transmitting an unusable process definition file to another MFP.

The first and second exemplary embodiments have specifically been described based on a case where the error occurrence is notified to the administrator PC 101, a generator of a process definition file, as processing for notifying the error occurrence to a source of the process definition file. However, instead of notifying the error occurrence to the administrator PC 101, the error occurrence may be notified to the file management server 102, a source of a process definition file, which supplied the process definition file to the MFP 103. In this case, the file management server 102 manages information about the necessity for correcting the content of process definition files in association with process definition files to be corrected. When the administrator PC 101 accesses the file management server 102, the administrator PC 101 knows the necessity for correcting the content of a process definition file registered from the administrator PC 101. When another MFP references a process definition file to be corrected, retained in the file management server 102, the other MFP can know the necessity for correcting the process definition file content.

The first and second exemplary embodiments have specifically been described based on an image processing system which includes the administrator PC 101, the file management server 102, the MFP 103, and the transmission server 104, shown in FIG. 1. However, these apparatuses may not be provided separately. A single apparatus may be provided with functions of two or more apparatuses (for example, the MFP 103 and the transmission server 104).

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-281858 filed Oct. 31, 2008, which is hereby incorporated by reference herein in its entirety.

What is claimed is:

1. A communication apparatus which communicates with an image processing apparatus including a reading unit for reading an image on a document to generate image data based on the read image, the communication apparatus comprising:
   a receiving unit configured to receive from the image processing apparatus a process definition file defining details of reading processing to be performed by the reading unit and details of transmission processing for transmitting the image data generated by the reading unit, and the image data generated by the reading unit according to definitions described in the process definition file;
   a first determination unit configured to determine whether the received process definition file is a usable process definition file;

a transmission unit configured to transmit the received image data according to the definitions described in the received usable process definition file;

a second determination unit configured to determine, when an error occurs in image data transmission by the transmission unit, whether the error is caused by the definitions described in the usable process definition file;

a requesting unit configured to request a source of the usable process definition file to correct the usable process definition file when the second determination unit determines that the error is caused by the definitions described in the usable process definition file, wherein the requesting unit does not request the source of the usable process definition file to correct the usable process definition file when the second determination unit determines that the error is not caused by the definitions described in the usable process definition file; and a registration unit configured to register the usable process definition file as an unusable process definition file according to a process ID associated with the usable process definition file when the second determination unit determines that the error is caused by the definitions described in the usable process definition file, wherein when the first determination unit determines that the received process definition file is not usable, transmission processing is canceled.

2. The communication apparatus according to claim 1, further comprising a notification unit configured to notify the occurrence of the error to the image processing apparatus when the second determination unit determines that the error is not caused by the definitions described in the usable process definition file.

3. The communication apparatus according to claim 1, further comprising a restriction unit configured to restrict the use of the usable process definition file when the requesting unit performs the request.

4. The communication apparatus according to claim 3, further comprising a canceling unit configured to cancel the restriction by the restriction unit when the source of the usable process definition file completes correction of the usable process definition file content.

5. A method for controlling a communication apparatus which communicates with an image processing apparatus including a reading unit for reading an image on a document to generate image data based on the read image, the method comprising:

receiving from the image processing apparatus a process definition file defining details of reading processing to be performed by the reading unit and details of transmission processing for transmitting the image data generated by the reading unit, and the image data generated by the reading unit according to the definitions described in the process definition file;

determining whether the received process definition file is a usable process definition file;

transmitting the received image data according to the definitions described in the received usable process definition file;

determining, when an error occurs in image data transmission, whether the error is caused by the definitions described in the usable process definition file;

requesting a source of the usable process definition file to correct the usable process definition file when it is determined that the error is caused by the definitions described in the usable process definition file, while not requesting the source of the usable process definition file to correct the usable process definition file when it is determined that the error is not caused by the definitions described in the usable process definition file; and registering the usable process definition file as an unusable process definition file according to a process ID associated with the usable process definition file when it is determined that the error is caused by the definitions described in the usable process definition file, wherein when it is determined that the received process definition file is not usable, transmission processing is canceled.

6. A non-transitory computer-readable storage medium storing a program for causing a computer to perform the method according to claim 5.

* * * * *